United States Patent [19]

Vilasagar

[11] Patent Number: 5,310,791

[45] Date of Patent: * May 10, 1994

[54] LOW GLOSS POLYCARBONATE BLENDS OBTAINED BY USING HYDROXY FUNCTIONALIZED GRAFT COPOLYMER

[75] Inventor: Shripathy Vilasagar, Parkersburg, W. Va.

[73] Assignee: General Electric Company, Pittsfield, Mass.

[ * ] Notice: The portion of the term of this patent subsequent to Apr. 12, 2011 has been disclaimed.

[21] Appl. No.: 843,127

[22] Filed: Feb. 28, 1992

[51] Int. Cl.⁵ .............................................. C08L 69/00
[52] U.S. Cl. ....................................... 525/67; 525/303
[58] Field of Search ............................................. 525/67

[56] References Cited

U.S. PATENT DOCUMENTS

| | | |
|---|---|---|
| 3,914,335 | 10/1975 | Tugukuni et al. |
| 4,034,013 | 7/1977 | Lane |
| 4,317,891 | 3/1982 | Sakano ................................. 525/66 |
| 4,444,950 | 4/1984 | Sakano et al. ........................ 525/67 |
| 4,500,679 | 2/1985 | DuFour ................................ 525/64 |
| 4,526,926 | 2/1985 | Weber .................................. 525/67 |
| 4,554,315 | 11/1985 | Chung et al. ......................... 525/67 |
| 4,569,969 | 2/1986 | Jones et al. .......................... 525/67 |
| 4,739,010 | 4/1988 | McKee et al. ........................ 525/67 |
| 4,774,286 | 9/1988 | Taubitz et al. ....................... 525/67 |
| 4,886,855 | 12/1989 | Parsons ................................ 525/67 |

FOREIGN PATENT DOCUMENTS 0023291 2/1981 European Pat. Off.
059258 4/1983 Japan.

Primary Examiner—David Buttner
Attorney, Agent, or Firm—Andrew C. Hess; Spencer D. Conard

[57] ABSTRACT

A thermoplastic blend composition is provided containing an aromatic polycarbonate and a hydroxy functional graft copolymer. The compositions exhibit reduced gloss and are useful as molding resins.

15 Claims, No Drawings

LOW GLOSS POLYCARBONATE BLENDS OBTAINED BY USING HYDROXY FUNCTIONALIZED GRAFT COPOLYMER

BACKGROUND OF THE INVENTION

1. Field of the Invention

The present invention relates to blends of aromatic polycarbonate resin and ABS resin, and more particularly relates to low gloss aromatic polycarbonate/ABS blends containing an hydroxy functionalized graft copolymer.

2. Description of the Related Art

Blends of polycarbonate resin and ABS resin are known, see for example, German Patent 1,170,141—many polycarbonate resin/ABS resin blends however exhibit high levels of gloss while in various applications it is desired that the blends exhibit low surface gloss.

SUMMARY OF INVENTION

The present invention provides low surface gloss PC/ABS blends. The blends comprise aromatic polycarbonate resin, a hydroxy functionalized graft copolymer which is preferably a hydroxy functionalized ABS resin, and wherein the ABS resin is functionalized with an amount of a hydroxy functional monomer sufficient to reduce the gloss of the blend.

DETAILED DESCRIPTION OF THE INVENTION

The polymer blend compositions of the invention comprise an aromatic polycarbonate resin and hydroxy functionalized graft copolymer. These blends exhibit a relatively low level of gloss compared to similar blends lacking the hydroxy functionalized graft copolymer.

The polycarbonate component included in the blend compositions may be any aromatic homo-polycarbonate or co-polycarbonate known in the art. The polycarbonate component may be prepared in accordance with any of the processes generally known in the art, for example, by the interfacial polycondensation process, polycondensation in a homogeneous phase or by transesterification. These processes and the associated reactants, polymers, catalysts, solvents and conditions are well known in the art and are described in U.S. Pat. Nos. 2,964,974; 2,970,137; 2,999,835; 2,999,846; 3,028,365; 3,153,008; 3,187,065; 3,215,668; 3,258,414 and 5,010,162, all of which are incorporated herein by reference. Suitable polycarbonates are based, for example, on one or more of the following bisphenols: dihydroxy diphenyls, bis-(hydroxyphenyl)-alkanes, bis-(hydroxyphenyl)-cycloalkanes, bis-(hydroxyphenyl)sulphides, bis-(hydroxyphenyl)-ethers, bis-(hydroxyphenyl)-ketones, bis-(hydroxyphenyl)-sulphoxides, bis-(hydroxyphenyl)sulphones, alkyl cyclohexylidene bisphenols, nod(hydroxyphenyl)diisopropyl benzenes, and their nucleus-alkylated and nucleus-halogenated derivatives, and mixtures thereof.

Specific examples of these bisphenols are 4, 4'-dihydroxy diphenyl, 2,2-bis-(4-hydroxyphenyl)propane, 2, 4-bis-(4-hydroxyphenyl)-2-methyl butane, 1, 1-bis-(4-hydroxyphenyl)-cyclohexane, α,α-bis-(4-hydroxyphenyl)-diisopropyl benzene, 2, 2-bis(3-methyl-4-hydroxyphenyl)propane, 2, 2-bis-(3-chloro-4-hydroxyphenyl)propane, 2, 2-bis-(3-chloro-4-hydroxyphenyl)-propane, bis-(3, 5-dimethyl-4-hydroxyphenyl)-methane, 2, 2-bis-(3,5-dimethyl-4-hydroxyphenyl)-propane, bis-(3, 5 -dimethyl-4-hydroxyphenyl)-sulphone, 2, 4-bis-(3, 5-dimethyl-4-hydroxyphenyl)-2-methyl butane, 1, 1-bis-(3, 5-dimethyl-4-hydroxyphenyl)-cyclohexane, a,a-bis-(3, 5-dimethyl-4-hydroxyphenyl)-p-diisopropyl benzene, 2, 2-bis-(3, 5-dichloro-4-hydroxyphenyl)-propane and 2, 2-bis-(3, 5-dibromo-4-hydroxyphenyl)-propane. A particular preferred bisphenol is 2, 2-bis-(4-hydroxyphenyl)-propane, more commonly known as bisphenol A. The bisphenols may be reacted with phosgene to produce the aromatic polycarbonates.

The hydroxy functionalized graft copolymer comprises a hydroxy functionalized rigid polymer grafted to a diene rubber substrate. The hydroxy functional rigid polymer is based on a hydroxy functional vinyl monomers and a vinyl cyanide monomer, and more preferably are further based on an aromatic vinyl monomer. Suitable hydroxy functional vinyl monomers include allyl alcohol and hydroxy functional esters of carboxylic acids obtained by reacting a carboxylic acid with an alcohol. Suitable carboxylic acids include acrylic, methacrylic, crotonic, maleic, fumaric, haconic and aconitic acids. Suitable alcohols include polyethylene glycol, polypropylene glycol, polybutylene glycol having from 1 to 60 alkyleneoxy repeating units, glycerol, pentaerithritol, cellulose, sorbitan, hydroxyalkyl derivatives thereof, polyvinyl alcohol and polymers and copolymers thereof, vinyl benzyl alcohol, isopropeiryl-benzyl alcohol, vinyl phenol, and isoproperiyl phenol. Examples of vinyl cyanide monomer are acrylonitrile and methacrylonitrile. Examples of aromatic vinyl compounds are styrene, alpha methyl styrene, dimethyl styrene and vinyl toluene. The preferred hydroxy functional monomer is obtained from reacting ethyl alcohol with methacrylic acid to yield hydroxyethylmethacrylate. Examples of hydroxyfunctional rigid polymers are set forth below. In a preferred embodiment, the hydroxy functional graft polymer is formed from hydroxy vinyl monomer, styrene and acrylonitrile and a diene rubber substrate. Diene rubber substrate is preferably selected from polybutadiene rubber and styrene-butadiene rubber. It is noted, however, that the hydroxy functional graft polymer is preferably a hydroxy functional ABS resin comprising 2-hydroxyethyl methacrylate, styrene and acrylonitrile grafted to polybutadiene. In this preferred embodiment, it is further preferred that the weight ratio of styrene to acrylonitrile in the rigid graft portion of the functionalized ABS resin is in the range of about 1:1 to about 10:1 so that the amount of styrene is equal to or greater than the amount of acrylonitrile included in the graft portion. The hydroxy functional graft polymer component may be prepared according to methods also well known in the art for the production of ABS resin; for example, bulk, suspension or emulsion processes, preferably emulsion processes. Methods of producing hydroxy functional ABS resin may result in a product comprising a mixture of functionalized ABS graft resin, non-functionalized graft resin, ungrafted styrene-acrylonitrile copolymer and ungrafted non-functionalized styrene-acrylonitrile copolymer. These mixtures are also suitable for use in the invention. The compositions may comprise amounts of non-functionalized ABS resin, wherein the non-functionalized ABS resin may be made in the same fashion as the functionalized ABS resin but lacks the hydroxyvinyl monomer component.

The hydroxy functional graft copolymer which is included in the compositions of the invention comprises a rubber substrate and a hydroxy functional rigid polymeric portion grafted to the rubber substrate. The rubber substrate is formed from at least one diene monomer of the formula:

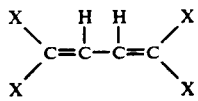

wherein X is selected from the group consisting of hydrogen, alkyl groups containing from 1 to 5 carbon atoms, chlorine and bromine. Examples of the diene monomer include butadiene, isoprene, 1,3-heptadiene, methyl-1, 3-pentadiene, 2-ethyl-1,3-pentadiene, mixtures thereof and the like. Preferably, the diene monomer comprises butadiene, wherein the rubber substrate comprises a polybutadiene substrate. Alternatively, at least one additional vinyl monomer may be included in the rubber substrate, such as styrene, thereby forming, for example, a styrene-butadiene rubber substrate. Although the hydroxy functional graft copolymer may include the rubber substrate and the grafted portion in any ratio which is desired, it is preferred that the rubber substrate be present at a level of at least 10 weight percent based on the total weight of the functionalized graft copolymer, and more preferably at least 40 weight percent thereof, for example from 40 to 75 weight percent thereof. In a preferred embodiment, the functionalized ABS resin comprises from about 50 to about 75 weight percent of the diene rubber substrate based on the total weight of the graft copolymer, and more preferably about 45 to about 55 weight percent thereof. Preferably the rubber substrate comprises at least 50 percent by weight 1,3-butadiene based on the total weight of the substrate.

The rigid graft polymeric portion of the graft copolymer is preferably formed from a hydroxyalkyl (meth)acrylate monomer, at least one vinyl aromatic monomer and at least one additional monomer. The at least one vinyl aromatic monomer may comprise styrene, substituted styrene monomer, or mixtures thereof. Substituted styrene monomers may include substituents on the aromatic portion and/or the vinyl portion, with preferred substituents being selected from the group consisting of alkyl groups of from 1 to 5 carbon atoms and halogen atoms such as chlorine and bromine. Preferred vinyl aromatic monomers include unsubstituted styrene, alphamethylstyrene, dibromostyrene, and mixtures thereof. The at least one additional monomer which is employed in forming the grafted portion is preferably selected from the group consisting of acrylonitrile, methacrylonitrile, alkyl (meth)acrylates, maleic anhydride, maleimide, alkyl maleimides and aryl maleimides. In a preferred embodiment, the grafted portion is formed from a hyroxyethyl methacrylate, styrene monomer and acrylonitrile, with the styrene and acrylonitrile being employed in a weight ratio of from 9:1 to 1:9 and preferably from 5:1 to 1:1.

The hydroxy functional graft copolymer may be formed by any of the methods well known in the art for the formation of ABS graft copolymers. For example, the functionalized graft copolymer may be formed by emulsion polymerization wherein the hyroxyalkyl methacrylate, the at least one styrene monomer and the at least one additional monomer are polymerized in the presence of the rubber substrate. Such a process may result in the formation of the functionalized grafted copolymer and an additional polymer of the hydroxyalkyl (meth)acrylate, the at least one styrene monomer and the at least one additional monomer, which copolymer does not contain the rubber substrate. Within the terms of the present specification and claims, reference to the hydroxy functional graft copolymer includes such mixtures of the functionalized graft copolymer and an additional copolymer formed from the grafting monomers.

The styrene may be replaced in whole or in part by other vinyl aromatic monomers, such as alpha methyl styrene, chloro-styrene, bromostyrene, p-methyl styrene and vinyl toluene. The hydroxyalkyl (meth)acrylate is preferably hydroxyethyl methacrylate and is included in the functionalized ABS resin in an amount sufficient to reduce the gloss of the blend. Suitable hydroxy alkyl (meth)acrylate monomers include hydroxy ethyl methacrylate. Preferably the hydroxyethyl methacrylate is present at a level of from 1 to 25 weight percent based on the total weight of the functionalized ABS resin. The hydroxyethyl methacrylate component may be replaced in whole or in part by hydroxy alkyl methacrylate and hydroxy alkylacrylate monomers, with alkyl chain lengths of $C_1$–$C_6$. The acrylonitrile component may be replaced in whole or in part by methacrylonitrile, or other (meth)acrylic acid ester monomers.

The hydroxy functional graft copolymer preferably comprises from 20 to 50 weight percent vinyl aromatic monomer based on the total weight of the hydroxy functional graft polymer, more preferably from 25 to 45 weight percent thereof, and most preferably from 30 to 40 weight percent thereof; preferably comprises a diene rubber substrate at a level of from 5 to 90 weight percent based on the total weight of the hydroxy functional graft copolymer, more preferably from 20 to 70 weight percent thereof, and most preferably 40 to 60 weight percent thereof; preferably comprises acrylonitrile at a level of from 5 to 30 weight percent based on the total weight of the hydroxy functional graft copolymer, more preferably from 5 to 25 weight percent thereof, and most preferably from 10 to 20 weight percent thereof, and preferably comprise hydroxy vinyl monomer methacrylate at a level of from 1 to 20 weight percent based on the total weight of the hydroxy functional graft copolymer, more preferably from 2 to 10 weight percent thereof and most preferably from 3 to 5 weight percent thereof.

The composition of the present invention preferably comprise from 15 to 80 weight percent aromatic polycarbonate based on the total weight of the composition, more preferably 50 to 75 weight percent thereof and most preferably 60 to 70 weight percent thereof; preferably the hydroxy functional graft copolymer is present at a level of from 5 to 60 weight percent based on the total weight of the composition, more preferably from 10 to 35 percent by weight thereof. Total diene rubber content is preferably at a level of at least 5 percent by weight based on the total weight of the compositions and preferably from 5 to 50 weight percent thereof. The compositions may also contain amounts of styrene-acrylonitrile copolymer, for example, from 5 to 40 weight percent based on the total weight of the composition: and may contain amounts of non-functionalized ABS resin at level of from 0 to 50 weight percent based on the total weight of the composition, for example from 1 to 45 weight percent non-functionalized ABS or may be free of non-functionalized ABS resin.

The thermoplastic compositions of the invention may be produced according to conventional methods employing conventional mixing and compounding apparatus including, for example, single and twin-screw extruders, mixing rolls and internal mixers. The thermoplastic compositions may also include or be free of various conventional additives including, among others, stabilizers, lubricants, flow aids, mod release agents, antioxidants, antistatic agents, fillers, glass fibers, pigments and the like. Polymethylmethacrylate may be added to the compositions to improve the melting strength thereof, and may be added in amounts of for example 5 to 25 weight percent based on the total weight of the compositions.

The thermoplastic compositions according to the present invention are demonstrated by the following example in which parts and percentages are by weight percent based on the total weight of the composition unless otherwise specified.

| Examples | A | 1 | 2 | 3 |
|---|---|---|---|---|
| Polycarbonate | 64.0 | 64.0 | 64.0 | 64.0 |
| SAN1 | 20.0 | 20.0 | 20.0 | 20.0 |
| nfABS | 16.0 | | | |
| ABS H3* | | 16.0 | | |
| ABS H5* | | | 16.0 | 8.0 |
| Izod Impact Strength (Ft-Lb/In), ¼" Notched | | | | |
| RT | 11.5 | 13.4 | 15.5 | 14.7 |
| −20 F. | 11.6 | 11.0 | 11.8 | 12.6 |
| 40 F. | 4.5 | 5.7 | 8.9 | 9.6 |
| Gardner Gloss. 60° | 92 | 27 | 27 | 40 |

*ABS H3 and -H5 indicate an ABS high rubber graft copolymer with 3 and 5 weight percent, respectively, of HEMA based on the total weight of the functional ABS graft polymer.

ABS H3 is a HEMA-SAN-PBD graft polymer comprising polybutadiene rubber substrate having HEMA-SAN rigid graft polymer grafted. The ABS-H3 comprised polybutadiene rubber substrate present at a level of 50 weight percent based on the total weight of the functionalized graft polymer and HEMA-SAN graft portion present at a level of 50 weight percent based on the total weight of the functionalized polymer. The styrene was present at a level of 35 weight percent based on the total weight of the functionalized graft polymer; the acrylonitrile was present at a level of 12 weight percent based on the total weight of the functionalized graft polymer; and the hydroxyethyl methacrylate is present at a level of 3 weight percent based on the total weight of the functionalized graft polymer.

ABS H5 is a HEMA-SAN-PBD graft polymer comprising polybutadiene rubber substrate having HEMA-SAN rigid graft polymer grafted. The ABS-H5 comprised polybutadiene rubber substrate present at a level of 50 weight percent based on the total weight of the functionalized graft polymer and HEMA-SAN graft portion present at a level of 50 weight percent based on the total weight of the functionalized polymer. The styrene was present at a level of 33 weight percent based on the total weight of the functionalized graft polymer; the acrylonitrile was present at a level of 12 weight percent based on the total weight of the functionalized graft polymer; and the hydroxy ehtyl methacrylate is present at a level of 5 weight percent based on the total weight of the functionalized graft polymer.

In the examples, the polycarbonate is a reaction product bisphenol-A and phosgene, the non-functionalized ABS resin (nfABS) of example A is a graft polymer containing 50 weight percent styrene-acrylonitrile copolymer (75:25 weight ratio S:AN) grafted on 50 polybutadiene rubber particles present at a level of 50 weight percent based on the total weight. Gardner gloss is measured by ASTM D2457. Examples A, 1, 2 and 3 employed a 0.1 weight percent of a phenolic antioxidant sold under trademark IRganox 3114 supplied by Ciba-Geigy; and employed 1.0 weight percent of a polyolefin lubricant additive sold under the trademark QUANTUM 3008.

The blends of examples A, 1, 2 and 3 were compounded at 550° F. and 200 rpm on a 34 mm Leistritz 10R twin screw extruder and then the dried blends were injection molded at 550° F. with 150° F. mold temperatures.

What is claimed is:

1. A thermoplastic blend composition consisting essentially of:
   (a) an aromatic polycarbonate polymer,
   (b) an hydroxy functional graft copolymer consisting of an hydroxy functional rigid polymeric portion grafted to a diene rubber substrate, wherein said hydroxy functional rigid polymeric portion is an hydroxy functional vinyl-vinyl aromatic-vinyl cyanide polymer.

2. The composition of claim 1 wherein said aromatic polycarbonate polymer is present at a level of from 50 weight percent to 75 weight percent based on the total weight of the composition, said hydroxy functional graft copolymer being present at a level of from 5 to 35 weight percent based on the total weight of the composition.

3. The thermoplastic blend composition of claim 1, wherein said composition consists of said aromatic polycarbonate polymer and said hydroxy functional graft copolymer.

4. The thermoplastic composition of claim 1 wherein said rubber substrate consists of polybutadiene rubber and said graft portion consists of an hydroxyalkyl (meth)acrylate-styrene-acrylonitrile terpolymer.

5. The composition of claim 4 further containing styrene-acrylonitrile polymer.

6. The composition of claim 5 wherein said aromatic polycarbonate polymer is present at a level of from 50 to 75 weight percent based on the total weight, said styrene-acrylonitrile copolymer is present at a level of from 10 to 25 weight percent based on the total weight of the composition, said hydroxyalkyl (meth)acrylate graft polymer being present at a level of from 5 to 35 weight percent based on the total weight of the composition.

7. A thermoplastic blend composition, consisting essentially of:
   (a) an aromatic polycarbonate polymer;
   (b) a hydroxyalkyl (meth)acrylate functionalized graft copolymer consisting of a diene rubber substrate and a hydroxyalkyl (meth)acrylate functionalized graft portion grafted thereto, said hydroxyalkyl (meth)acrylate functionalized graft portion being present in an amount sufficient to reduce the gloss of the blend composition, said hydroxyalkyl (meth)acrylate functionalized graft portion consisting of at least one hydroxy functional vinyl monomer, at least one vinyl aromatic monomer, and at least one vinyl cyanide monomer.

8. The thermoplastic composition of claim 7 wherein said diene rubber substrate is a polybutadiene rubber substrate.

9. The thermoplastic composition of claim 7, wherein said aromatic polycarbonate polymer is present at a level of from 15 weight percent to 80 weight percent based on the total weight of the composition, and said functionalized graft copolymer being present at a level of from 5 to 60 weight percent based on the total weight of said composition.

10. The composition of claim 7 wherein said hydroxyalkyl (meth)acrylate graft polymer consists of a hydroxyethyl methacrylate-styrene-acrylonitrile rigid graft polymer grafted onto a diene rubber substrate, said diene rubber substrate comprising at least 50 weight percent, 1,3-butadiene based on the total weight of the diene rubber substrate.

11. The composition of claim 7 wherein said composition consists of said aromatic polycarbonate polymer and said hydroxyalkyl (meth) acrylate functionalized graft copolymer.

12. The thermoplastic composition of claim 7, wherein said aromatic polycarbonate polymer is present at a level of from 50 weight percent to 75 weight percent based on the total weight of the composition, and said functionalized graft copolymer being present at a level of from 5 to 35 weight percent based on the total weight of said composition.

13. The composition of claim 12 wherein said rubber substrate is present at a level of from 50 to 80 weight percent based on the total weight of the functionalized graft copolymer.

14. A thermoplastic blend composition consisting essentially of:
   (a) an aromatic polycarbonate polymer present at a level of from 50 to 75 weight percent based on the total weight of the composition;
   (b) a gloss-reducing amount of a functionalized graft copolymer comprising a polybutadiene rubber substrate and a hydroxyethyl methacrylate-styrene-acrylonitrile copolymer portion grafted thereon, said functionalized graft polymer being present at a level of from 5 to 25 weight percent based on the total weight of the copolymer; and
   (c) a styrene-acrylonitrile polymer present at a level of from 10 to 35 weight percent based on the total weight of the composition.

15. The composition of claim 14 wherein said composition consists of said aromatic polycarbonate polymer, said functionalized graft copolymer and said styrene-acrylonitrile polymer.

* * * * *